E. A. SWEELEY ET AL
Jan. 27, 1931. METAL HATCHWAY FRAME AND COVER Re. 17,939
Original Filed April 8, 1929 2 Sheets-Sheet 1
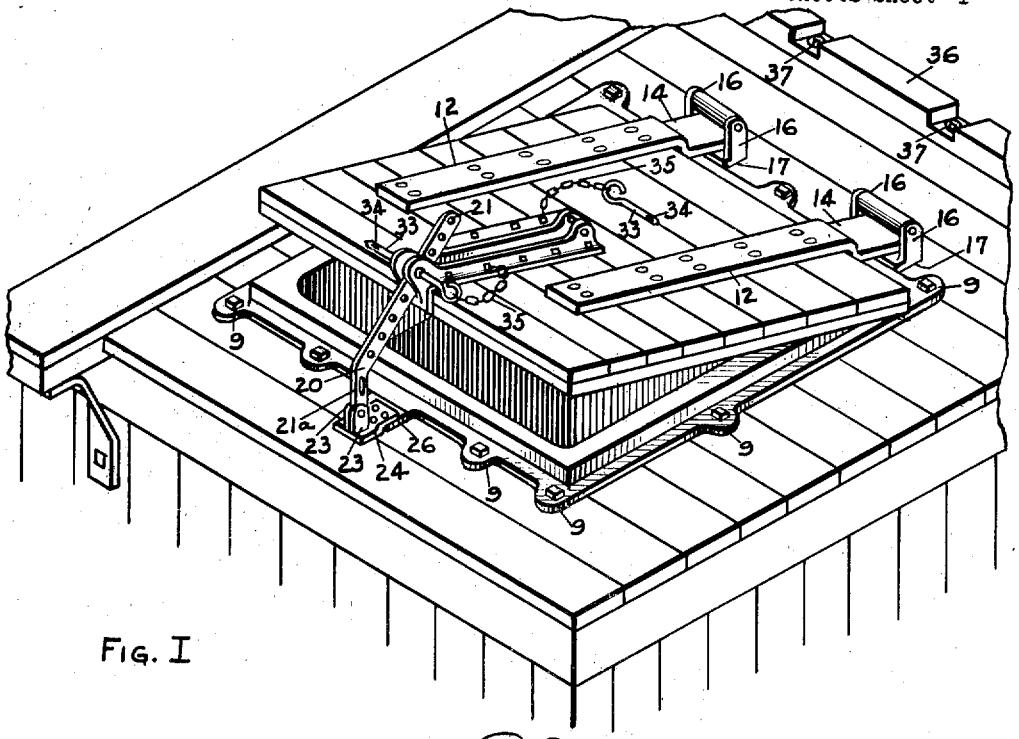
FIG. I
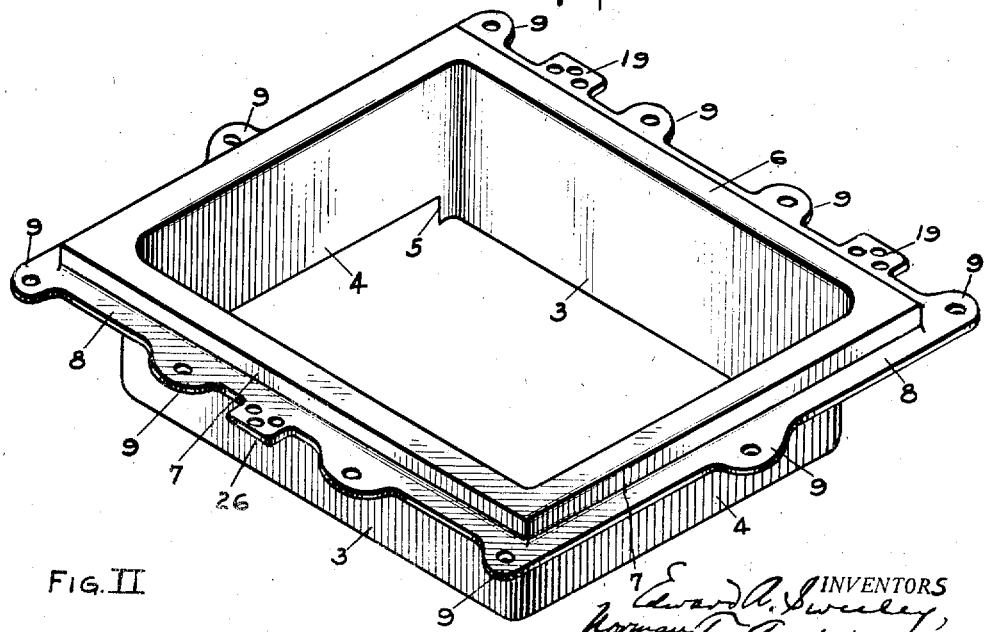
FIG. II
INVENTORS
Edward A. Sweeley,
Norman T. Anderson,
BY
R. G. Mudgett,
ATTORNEY.

E. A. SWEELEY ET AL
Jan. 27, 1931. METAL HATCHWAY FRAME AND COVER Re. 17,939
Original Filed April 8, 1929 2 Sheets-Sheet 2
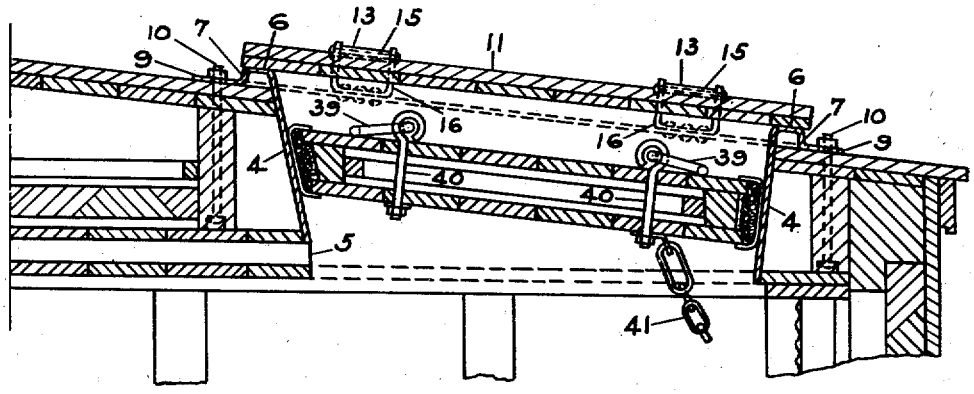
FIG. III
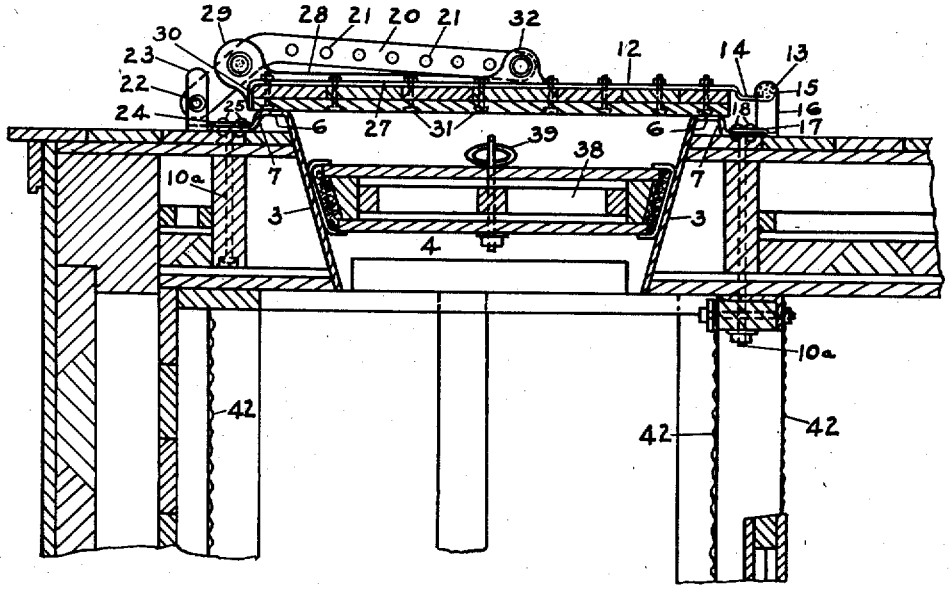
FIG. IV
INVENTORS
Edward A. Sweeley
Norman T. Anderson
BY
A. G. Anderson, ATTORNEY.

Reissued Jan. 27, 1931 Re. 17,939

UNITED STATES PATENT OFFICE

EDWARD A. SWEELEY, OF ALEXANDRIA, VIRGINIA, AND NORMAN T. ANDERSON, OF WASHINGTON, DISTRICT OF COLUMBIA

METAL HATCHWAY FRAME AND COVER

Original No. 1,776,168, dated September 16, 1930, Serial No. 353,554, filed April 8, 1929. Application for reissue filed December 1, 1930. Serial No. 499,379.

Our invention relates to metal hatchways and covers therefor, designed more particularly for use in refrigerator cars but not restricted to that particular use.

It has for its object to so construct the metal hatchway that it will form a substantially tight seal between the hatchway and adjacent portions of the hatch opening so as to prevent escape and waste of refrigerated air at the hatch opening and also protect the portions of the hatch opening along the lines of the metal hatchway against damage from the ice while being supplied to the ice crib or container, and also provide a seal for the hatch-cover when closed. It has also for its object to provide effective means for securing and locking the hatch-cover in a partially opened position when it is desirable to ventilate the car or other chamber formed with the hatch opening, or in its completely closed position when ventilation is not needed. It has further for its object to provide improved features of construction in the metal hatchway, and also in the means for securing and locking the hatch-cover in its partially opened or entirely closed position.

To the accomplishment of the foregoing and such other objects as may hereinafter appear, the invention consists in the features hereinafter particularly described and then sought to be clearly defined by the claims, reference being had to the accompanying drawings, forming a part hereof, and in which, Figure 1 is a perspective of portions of a car, showing the metal hatchway and closure or door applied thereto, the door being supported and locked in a partially opened position;

Figure 2 is a perspective of the metal hatchway detached, on an enlarged scale;

Figure 3 is a vertical transverse section through portion of a car and showing in vertical longitudinal section the metal hatchway, its closure or door, and a closure plug in the hatchway;

Figure 4 is a vertical section through the parts shown in Figure 3, taken at right angles to Figure 3.

In the drawings the numeral 1 designates a refrigerator car the general construction of which may be of any approved type, and is selected for an illustration of one embodiment of our invention. Refrigerator cars in general are provided with one or more hatch openings, usually formed in the car roof, for insertion of a refrigerant, usually ice, for cooling the air circulating through the car. In the present drawings one such opening or hatch is shown provided with the novel hatchway frame, although any desired number may be formed. The metal hatchway of the present invention is clearly illustrated in Figure 2 of the drawings and its application in Figures 1, 3 and 4 of the drawings. It is preferably made of malleable iron, and of a general rectangular formation, and cast in one piece so as to be free from leaky joints and possess greater powers of resistance and longer duration of life. It comprises depending side walls 3 and end walls 4 converging downwardly and defining a through opening, preferably slightly wider at one end than the other as shown, and which may be reinforced or not, as desired, by integrally cast crossed ribs on their outer faces, but as such ribs are not absolutely essential they are not illustrated. A part of the lower portion of one of the end walls is cut away to form an opening 5 through which ice may be pushed by a suitable tool from the hatchway into the adjacent space between the car roof and the ceiling for a better distribution of the ice over a greater area. The upper edges of the side and end walls of the hatchway are formed with a peripheral, integrally formed outwardly overhanging channeled rim 6. From the lower edge of the outer wall 7 of the channeled rim 6 a flange 8 extends outwardly and is formed with any desired number of apertured lugs 9 to receive bolts 10 and 10*a* for securing the metal hatch frame to the roof of the car.

A cover 11 is provided for the hatchway and it is hinged at one end to the hatchway frame. For that purpose metal straps 12 are bolted to the cover and formed with eyes 13 preferably formed as a part of depressed end portions 14 of the straps. Pintles 15 passed through these eyes are journaled in upright posts or ears 16 extending upward from plates 17 which are connected by bolts or rivets 18 to seats 19 cast integrally with the flange 8 of the hatchway frame. The cover in its completely closed position will rest upon the top face of channeled rim 6 as illustrated in Figs. 3 and 4. For locking the cover in either its completely or partially closed position there is provided a bell-crank link 20, formed with a number of holes 21, which is pivoted or hinged at one end by a pintle 22 fitted in openings formed in upright ears 23 between which the end of the link fits, the ears extending upward from a base-plate 24 which is secured by bolts or rivets 25 to a seat plate 26 preferably formed integral with the frame flange 8 as illustrated in Figs. 1 and 2. A keeper for the swinging link 20 comprises a base-plate 27 provided with two parallel upright standing longitudinally extending ribs 28 spaced apart from each other and formed at one end with upwardly and forwardly extending spaced apart ears 29 having openings registering one with the other, the end of plate 27 having a depending lip or flange 30 adapted to extend across the adjacent edge of the cover as shown in Figs. 1 and 2 so as to assist in holding the base-plate firmly to the cover when secured thereto say by bolts 31 passing through the base-plate and the cover as shown in Figs. 1, and 2. At the opposite end to the ears 29, the ribs 28 or base-plate are formed with upstanding ears 32 spaced apart and formed with registering openings. When the cover is in completely closed position, the link 20 will lie between the ears 29 and also between ears 32 and will be locked in that position by seal-pins 33 passed through the openings in the two sets of ears and the openings in the link 20 registering therewith, and by a well known form (not shown) of seal, or padlock hasp passed through slots 34 formed in the free ends of the pins to receive the seal. These seal pins may be flexibly connected to the base-plate 27 by chains 35 so as not to be misplaced. The cover may be held in a more or less open position by partially raising the cover, as illustrated in Fig. 1 and passing one of the seal pins through the ears 29 and an opening in the link 20 registering therewith, and then passing a seal or a padlock hasp, or other known type of seal through the eye-slot in the end of the sealing pin. To lock the cover in its closed position a seal pin will be passed through the ears 29 and an elongated slot 21*a* in the short arm of the bell-crank link, the elongated slot making provision for any possible swelling or shrinkage in the cover so that the locking is very easily effected. A block or bar 36 of suitable material may be secured to the car roof by bolts 37 or otherwise to afford a rest for the cover when thrown entirely open.

A closure plug, designated by the numeral 38 having tapering sides, preferably cushioned, corresponding substantially to the taper or incline of the side and end walls of the metal hatch frame, may be employed for making an effective seal against the wasteful escape of the refrigerating air. The plug may be provided with rings 39 secured thereto by bolts 40, or otherwise by which the plug may be removed when necessary and replaced and a chain 41 may flexibly connect the plug with a suitable part of the car structure to prevent entire detachment and possible loss of the plug. The numeral 42 designates partitions or screens of reticulated metal or other material suitably supported by pillars or cross timbers, or both, for the passage of air from the interior of the car into and through the ice chest or crib without escape of ice from the chest or crib.

The malleable iron hatch frame cast with the downwardly converging side and end walls and with the channeled overhanging rim made integral therewith avoids joints between the parts and provides the hatchways of standard size to fit in the opening formed in the car structure without necessity of shaping the wooden elements of the car structure to conform to the shape of the hatch-frame, and also effectively protects the wood about the hatch against being damaged in filling the crib or well with ice. It also contributes to expedition in installing the hatch-frame and further makes possible the installation by employment of a lower degree of skilled labor so that the cost is materially lessened. Again, the construction gives increased strength to the hatch-frame so that it is better fitted to resist the heavy strains and usage to which subjected. The improved means devised for locking the hatch cover in place simplifies the parts and lessens the cost of production as well as facilitating their manipulation in opening and closing the cover and in holding it in various degrees of adjustment for ventilating purposes and guarding against pilfering of ice from the ice chest or crib.

We have described with particularity the preferred details of various parts but changes may be made therein without departing from essential features as sought to be defined by the appended claims.

Having described our invention and set forth its merits what we claim is:

1. A metal hatch-way of a one-piece seamless casting having downwardly and inwardly converging side and end walls, an integrally formed overhanging peripheral channeled rim extended laterally from the upper ends of the side and end walls, and a laterally projecting flange extending from the outer wall of the channeled rim with portions thereof formed with openings for reception of means for securing the hatch-way frame in place.

2. A metal hatch-way of a one-piece seamless casting having downwardly and inwardly converging side and end walls, an integrally formed overhanging peripheral channeled rim extended laterally from the upper ends of the side and end walls, seats integral with the casting at one side thereof for attachment of cover hinges, and a seat formed integrally with the opposite wall of the casting at a point intermediate of the seats for the cover hinges to receive a cover locking member.

3. In combination with a hatch-way and cover therefor; means for locking the cover in a partially open, or in closed position, comprising a hinged perforated link positioned at one side of the hatch-way, and a keeper secured to the cover to receive the link, said keeper including a plate having up-standing parallel spaced-apart ribs and perforated ears secured to the cover and disposed one in relation to the other that a seal pin passed through one ear and registering aperture of the link will lock the cover in a partially open position and passed through the other ear and another perforation of the link will lock the cover in a closed position.

4. In combination with a hatch-way and cover therefor; means for locking the cover in a partially open, or in closed position, comprising a hinged perforated bell-crank link formed with an elongated slot in its short arm, and a plate having up-standing parallel spaced-apart ribs and pairs of perforated ears spaced apart and the ears of each pair spaced from each other to receive the hinged link, the pairs of ears being so disposed one in relation to the other that a seal pin passed through one pair and the interposed link will lock the cover in a partially open position and passed through the other pair and the elongated slot in the interposed link will lock the cover in a closed position.

5. In combination with a hatch-way and cover therefor; means for locking the cover in a partially open, or in closed position, comprising a hinged perforated link, and a keeper secured to the cover to receive the link, said keeper including a base-plate formed at one end with a depending flange to bear against one edge of the cover and having upstanding parallel spaced-apart ribs and provided with pairs of perforated ears, one pair spaced from the other and the ears of each pair spaced from each other to receive the perforated link therebetween, and one pair so disposed in relation to the other that a seal pin passed through one pair and the interposed link will lock the cover in a partially open position and passed through the other pair and interposed link will lock the cover in a closed position.

6. A hatch-way frame consisting of a one-piece seamless member possessing inherent characteristics of rigidity and formed with downwardly and inwardly converging side and end walls defining a through-opening in the member and having an integrally formed, peripherally disposed, overhanging channeled rim extended outwardly from the upper ends of the side and end walls and having also a laterally projecting flange extending from the outer wall of the channeled rim with portions thereof formed to receive means for securing the hatchway frame in place.

7. A hatch-way frame consisting of a one-piece seamless member possessing inherent characteristics of rigidity and formed with downwardly and inwardly converging side and end walls defining a through-opening in the member and having an integrally formed, peripherally disposed, overhanging channeled rim extending outwardly from the upper ends of said walls and formed with a laterally projecting flange to receive means for securing the hatchway frame in place, a wall of the member having an opening formed therein to receive a tool for spreading a refrigerant supplied to the through-opening in the member.

In testimony whereof we affix our signatures.

EDWARD A. SWEELEY.
NORMAN T. ANDERSON.